(12) United States Patent
Tokunaga

(10) Patent No.: US 6,349,175 B1
(45) Date of Patent: *Feb. 19, 2002

(54) FLASH PHOTOGRAPHY SYSTEM

(75) Inventor: Tatsuyuki Tokunaga, Yono (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/072,150

(22) Filed: May 4, 1998

(30) Foreign Application Priority Data

May 13, 1997 (JP) .............................. 9-122538

(51) Int. Cl.[7] .............................................. G03B 15/03
(52) U.S. Cl. ...................................... 396/157; 396/234
(58) Field of Search ................................ 396/157, 172, 396/159, 162, 268, 269, 267, 271, 63, 65, 61, 62

(56) References Cited

U.S. PATENT DOCUMENTS 5,227,836 A * 7/1993 Yasukawa et al. .......... 396/157
5,231,447 A * 7/1993 Takagi ........................ 396/157
5,892,987 A * 4/1999 Ohmori ....................... 396/61

* cited by examiner

Primary Examiner—David M. Gray
(74) Attorney, Agent, or Firm—Robin, Blecker & Daley

(57) ABSTRACT

The present invention relates to a flash photography system of the type which controls the amount of light emission of a main light emission on the basis of a measured-light value obtained when a preliminary light emission is performed. The present invention provides the aforesaid type of flash photography system in which multiple divided light measuring means is made to perform light measurement during the preliminary light emission, and weighting of a measured-light value relative to a predetermined area in the multiple divided light measuring means and weighting of a measured-light value relative to another area in the multiple divided light measuring means are made to differ from each other according to a size occupied by a subject in the image plane so that the amount of light emission is correctly controlled.

8 Claims, 10 Drawing Sheets

| CENTRAL AREA SELECTED FOR COMPUTATION | OTHER AREAS SELECTED FOR WEIGHTING |
|---|---|
| A0 | A1, A2, A3, A4, A5, A6 |
| A1 | A0, A2, A6, A7, A8, A18 |
| A2 | A0, A1, A3, A8, A9, A10 |
| A3 | A0, A2, A4, A10, A11, A12 |
| A4 | A0, A3, A5, A12, A13, A14 |
| A5 | A0, A4, A6, A14, A15, A16 |
| A6 | A0, A1, A5, A16, A17, A18 |

FLASH PHOTOGRAPHY SYSTEM

BACKGROUND OF THE INVENTION

1. Field of the Invention

The present invention relates to a camera system which performs a light emission toward a subject and adjusts the amount of light emission to automatically obtain the amount of correct exposure, and then performs an exposure operation.

2. Description of Related Art

It has heretofore been proposed to provide various camera systems of the type which performs a light emission toward a subject and adjusts the amount of light emission to automatically obtain the amount of correct exposure, and then performs an exposure operation.

It can be said that, among others, a camera system, which is arranged to perform a preliminary light emission before an exposure operation, perform light measurement of subject-reflected light of the preliminary light emission for each of a plurality of areas into which an image plane is divided, and perform control of the amount of light emission of a main light emission on the basis of the result of the light measurement, is a superior system capable of coping with various statuses appearing in a photographic image plane.

For example, Japanese Laid-Open Patent Application No. Hei 4-331935 has proposed a system which is arranged to exclude an area indicative of a measured-light value which is outside the range of particular values of the measured-light values of surface-reflected light of a preliminary light emission for a plurality of areas, from areas which are targets for a computation which determines the amount of light emission of a main light emission, a system which is arranged to add a predetermined correction value to the amount of light emission of a preliminary light emission according to the measured-light value of subject-reflected light of the preliminary light emission, and other systems.

Otherwise, it has been proposed to add a predetermined correction value to the amount of light emission of a preliminary light emission according to the measured-light value of reflected light of the preliminary light emission.

Any of the above-described systems is intended to solve the problem that if reflective matter such as window glass is opposed to the image plane, specular reflection light of flash light greatly influences a measured-light value and the amount of light of flash light is controlled by an amount which causes an underexposure, or that if the size of a main subject in the image plane is extremely small, the measured-light value of subject-reflected light of flash light becomes extremely small and the amount of light of flash light is controlled by an amount which causes an overexposure.

However, any of these systems is still insufficient, and there remain photographic scenes for which a correct amount of flash exposure cannot be obtained.

BRIEF SUMMARY OF THE INVENTION

In accordance with one aspect of the present invention, there is provided a flash photography system which performs control of the amount of light emission of a main light emission on the basis of a measured-light value obtained when a preliminary light emission is performed, and in order to realize correct control of the amount of flash light emission, the flash photography system comprises a control circuit which performs weighting of a measured-light value relative to a predetermined area and a measured-light value relative to another area, both of which are obtained through light measurement by multiple divided light measuring means for performing multiple divided light measurement of each of the areas of the image plane during a preliminary light emission, and performs control of the amount of light emission of the main light emission on the basis of the weighted measured-light values, and weighting means for performing such weighting on the basis of a size occupied by a main subject in the image plane, a subject distance or the measured-light value relative to the predetermined area during the preliminary light emission.

The above and other objects, features and advantages of the present invention will become apparent from the following detailed description of preferred embodiments of the present invention, taken in conjunction with the accompanying drawings.

DETAILED DESCRIPTION OF THE INVENTION

Preferred embodiments of the present invention will be described below in detail with reference to the accompanying drawings.

FIGS. 1 to 7 and FIGS. 10 and 11 show a first embodiment of the present invention.

Figure 1:
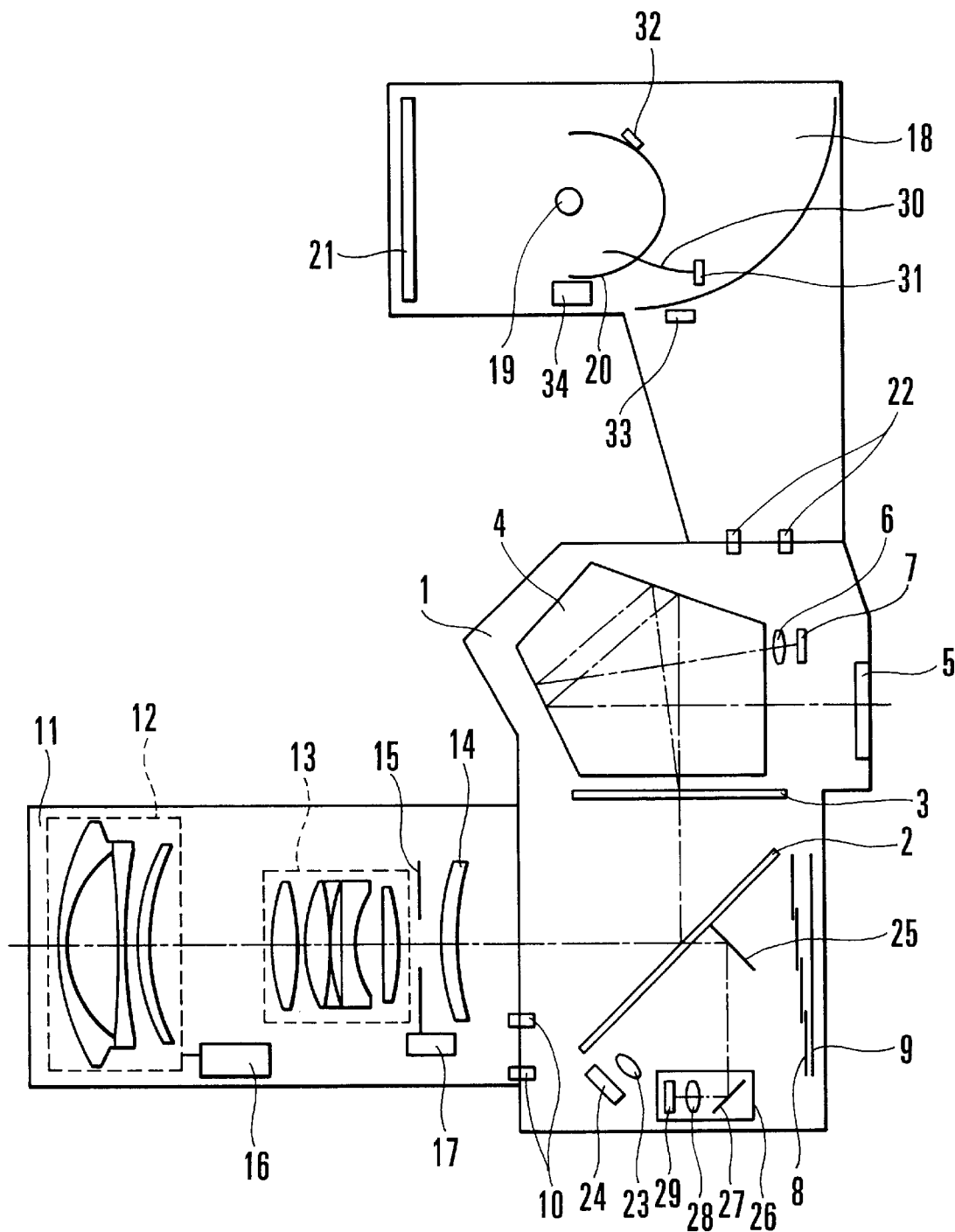
FIG. 1 is a diagrammatic cross-sectional view of a camera system having a flash device according to a first embodiment of the present invention.

FIG. 1 is a diagrammatic cross-sectional view mainly showing the optical arrangement of a camera system having a flash device, which is a single-lens reflex camera to which the present invention is applied.

The single-lens reflex camera shown in FIG. 1 includes a camera body 1 in which optical parts, mechanical parts, electrical circuits, film and the like are accommodated so that photography can be performed. A main mirror 2 is arranged to be obliquely inserted into a photographing optical path or retracted therefrom according to whether the shown camera is placed in an observation-enabled state or a photography-enabled state. The main mirror 2 is a half-mirror which, when it is obliquely inserted in the photographing optical path, transmits approximately half of a light ray reflected from a subject and received by the main mirror 2 to a focus detecting optical system which will be described later.

A focusing screen 3 is disposed in a predetermined image forming plane of a photographing lens (12 to 14), and a pentagonal prism 4 is provided for changing a viewfinder optical path. A viewfinder window 5 is arranged so that a photographer can observe a photographic image plane by observing the focusing screen 3 through the viewfinder window 5. An image forming lens 6 and a multiple divided light measuring sensor 7 are provided for measuring a subject luminance in the photographic image plane. The image forming lens 6 conjugationally relates the focusing screen 3 and the multiple divided light measuring sensor 7 to each other via a reflected-light optical path in the pentagonal roof prism 4.

Figure 4:
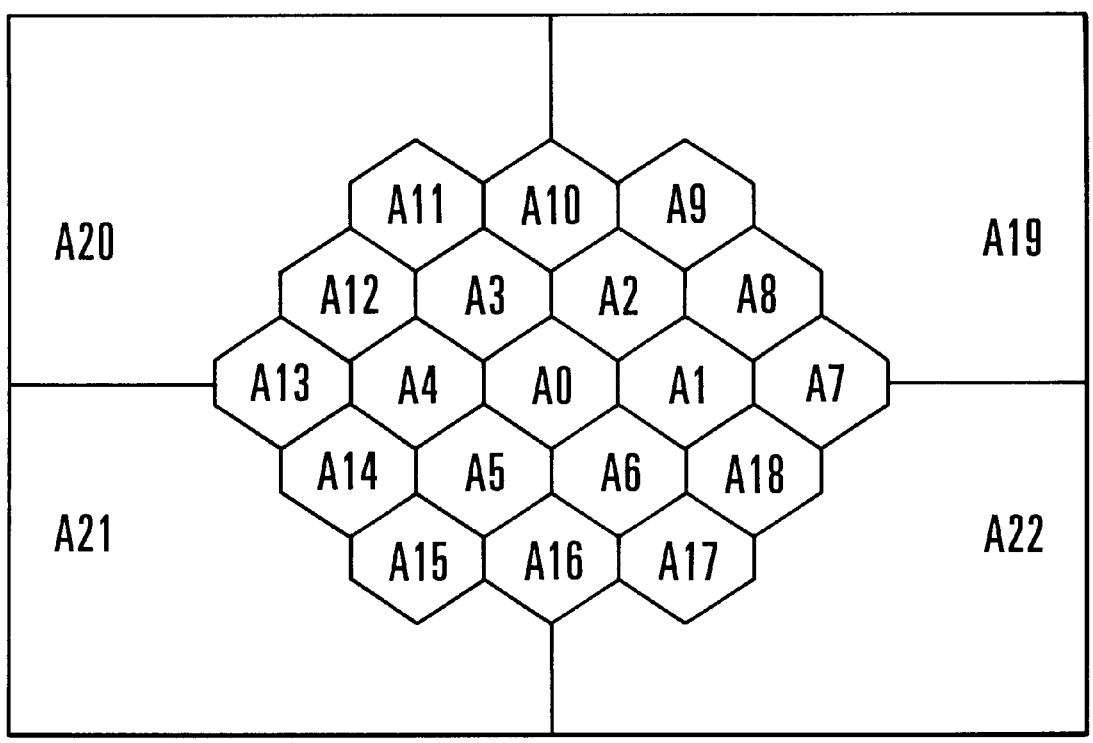
FIG. 4 is a schematic view showing the manner of division of an image plane used in the light measuring circuit shown in FIG. 2.

FIG. 4 is a schematic view showing divided light measuring areas provided on the photographic image plane. The photographic image plane is divided into twenty-three areas A0 to A22. The multiple divided light measuring sensor 7 is capable of measuring the luminances of the respective areas which are conjugationally related to the photographic image plane.

Referring back to FIG. 1, the camera body 1 also includes a shutter 8 and a sub-mirror 25 which bends downwardly the reflected light ray of the subject and conducts the light ray to a focus detecting unit 26 (the main mirror 2, when it is obliquely inserted in the photographing optical path, transmits approximately half of the light ray reflected from the subject and received by the main mirror 2). A photosensitive material 9 is a silver-halide film or the like. A secondary image forming mirror 27, a secondary image forming lens 28, a focus detecting line sensor 29 and the like are provided in the focus detecting unit 26.

The secondary image forming mirror 27 and the secondary image forming lens 28 constitute a focus detecting optical system, and form a secondary image forming plane of a photographing optical system on the focus detecting line sensor 29. The focus detecting unit 26 serves as an automatic focus detecting device by detecting the state of focus of a subject in the photographic image plane by a known phase-difference detecting method and controlling a focus adjusting mechanism for the photographing lens system, through processing performed by an electrical circuit which will be described later.

In this automatic focus detecting device, the focus detecting line sensor 29 is arranged to detect the states of focus at seven points corresponding to the respective areas A0 to A6 in the photographic image plane shown in FIG. 4.

The camera body 1 also includes a light measuring lens 23 for measuring light reflected from a film surface, and a light-on-film-surface measuring sensor 24. These elements 23 and 24 are used for so-called TTL flash control which measures the amount of exposure by using the diffuse reflection of light which has reached the film surface during an exposure, and obtains a correct amount of light of flash light.

Reference numeral 10 denotes a mount contact group which serves as an interface between the camera body 1 and a lens barrel 11. The lens barrel 11 is secured to the camera body 1. The lens groups 12 to 14 constitute the photographing lens. The first lens group 12 is capable of moving along the optical axis of the photographing lens and adjusting the position of focus with respect to the photographic image plane. The second lens group 13 is arranged to move along the optical axis and vary the magnification of the photographic image plane, i.e., the focal length of the photographing lens. The lens group 14 is a third lens group which is fixed. Reference numeral 15 denotes a diaphragm of the photographing lens.

A driving motor 16 for the first lens group 12 causes the first lens group 12 to move along the optical axis in accordance with an automatic focus adjusting operation, thereby automatically adjusting the position of focus. A driving motor 17 for the diaphragm 15 serves to open and close the diaphragm 15.

An external flash device 18 is secured to the camera body 1, and executes light emission control in accordance with a signal supplied from the camera body 1. The flash device 18 includes a xenon tube 19 which converts electric-current energy into light emission energy, a reflector 20, and a Fresnel lens 21. The reflector 20 and the Fresnel lens 21 have the role of efficiently gathering the light emission energy toward a subject. Reference numeral 22 denotes a known contact group which serves as an interface between the camera body 1 and the flash device 18.

The flash device 18 also includes a glass fiber 30 which conducts light emitted by the xenon tube 19 to a monitoring sensor (PD1) 31. The sensor (PD1) 31 directly measures the amounts of light of a preliminary light emission and a main light emission of the flash device 18, and is provided for control of the amount of light emission of the main light emission. A sensor (PD2) 32 is provided for monitoring light emitted by the xenon tube 19. By restricting the light emission current of the xenon tube 19 according to the output of the sensor (PD2) 32, the flash device 18 can be made to perform a flat light emission.

A switch 33 is provided for detecting whether the flash device 18 is in a bounce photography mode. An illuminating-angle (flash zoom) adjusting mechanism 34 serves to move the reflector 20 backward and forward and adjust the illuminating angle of a light emission to the image plane according to the focal length of the photographing lens.

Although FIG. 1 shows only the optical members and the mechanical members selected from among the members required for realizing the present invention, it is of course necessary to use various other electrical circuit members none of which is shown.

Figure 2:
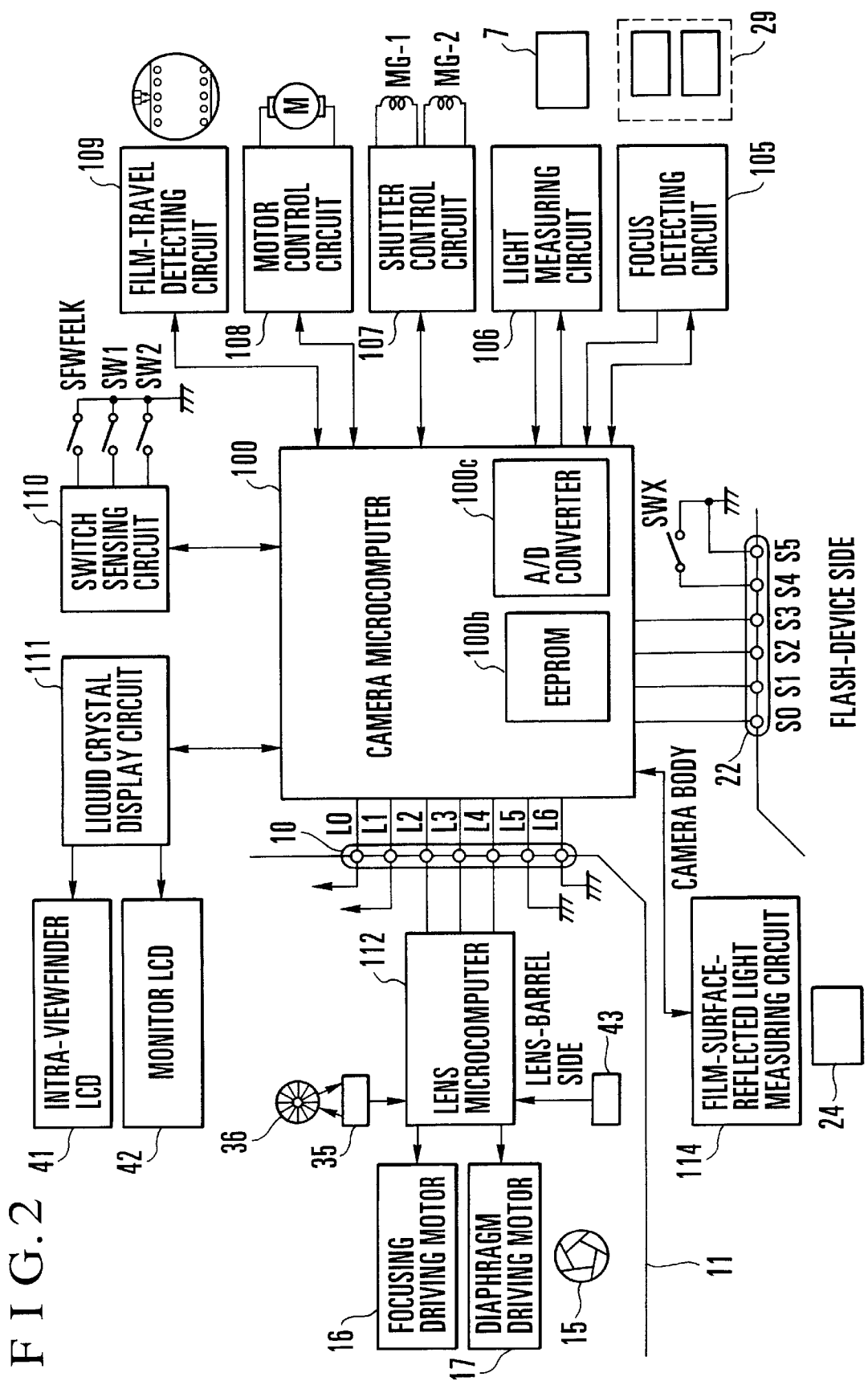
FIG. 2 is a block diagram showing the electrical circuit of the camera system shown in FIG. 1.
Figure 3:
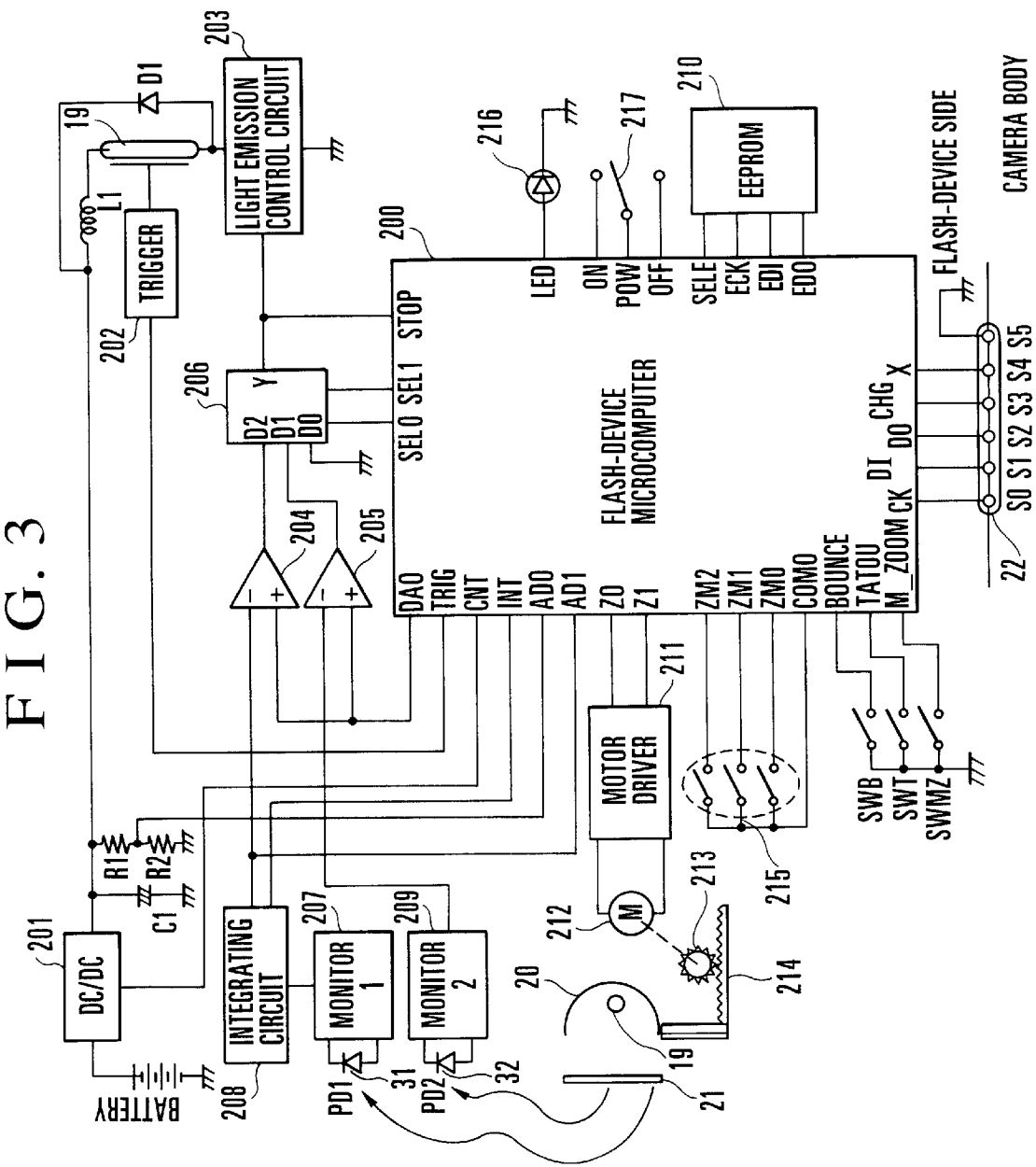
FIG. 3 is a block diagram showing the electrical circuit of the flash device of the camera system shown in FIG. 1.

FIGS. 2 and 3 show block diagrams of electrical circuits of the camera system having the flash device, according to the first embodiment. FIG. 2 shows a block diagram of the electrical circuit provided on a camera-body side and a lens-barrel side, and FIG. 3 shows a block diagram showing the electrical circuit provided on a flash-device side. In FIGS. 2 and 3, identical reference numerals are used to denote members corresponding to those shown in FIG. 1.

Referring first to FIG. 2, a camera microcomputer 100 controls the operation of the camera body 1 in accordance with predetermined software. An EEPROM 100*b* is capable of storing a film count value and other photography information. An A/D converter 100*c* performs A/D conversion of analog signals supplied from a focus detecting circuit 105 and a light measuring circuit 106. The camera microcomputer 100 sets various states by performing signal processing of a digital value supplied from the A/D converter 100*c*.

Connected to the camera microcomputer 100 are the focus detecting circuit 105, the light measuring circuit 106, a shutter control circuit 107, a motor control circuit 108, a film-travel detecting circuit 109, a switch sensing circuit 110 and a liquid crystal display circuit 111. The camera body 1 communicates signals with the lens barrel 11 via the mount contact group 10. If the flash device 18 is attached directly to the camera body 1, the camera body 1 communicates signals with the flash device 18 via a contact group 22.

The line sensor 29 is arranged to detect the states of focus at seven points corresponding to the respective areas A0 to A6 in the photographing image plane of the viewfinder as described above, and includes a pair of line sensor parts which are disposed to correspond to the focus detection points in the secondary image forming plane of the photographing optical system. The focus detecting circuit 105 performs storage control and reading control of the line sensor 29 in accordance with a signal supplied from the camera microcomputer 100, and outputs to the camera microcomputer 100 pixel information which is photoelectrically converted by each of the line sensor parts.

The camera microcomputer 100 performs A/D conversion of the pixel information and performs focus detection based on a known phase-difference detection method. The camera microcomputer 100 performs an exchange of signals with the lens microcomputer 112 on the basis of the focus detection information, to adjust the focus of the photographing lens.

The light measuring circuit 106 outputs to the camera microcomputer 100 the output from the multiple divided light measuring sensor 7 which divides the photographic image plane into the twenty-three areas A0 to A22 as described above, i.e., the luminance signals of the respective areas in photographic image plane. The light measuring circuit 106 outputs luminance signals both when the flash device 18 is in a steady state in which the flash device 18 has not yet performed a preliminary light emission toward a subject and when the flash device 18 is in a preliminary light emission state in which the flash device 18 has performed the preliminary light emission. The camera microcomputer 100 performs A/D conversion of the luminance signals, and performs a computation on an aperture value and a computation on a shutter speed for adjusting the amount of exposure for photography, and a computation on the amount of light emission of the main light emission of the flash device 18 during an exposure.

The shutter control circuit 107 causes a shutter leading curtain (MG-1) and a shutter trailing curtain (MG-2) to run to control an exposure operation, in accordance with a signal from the camera microcomputer 100. The motor control circuit 108 controls a motor M in accordance with a signal from the camera microcomputer 100, to cause the motor M to move the main mirror 2 up and down, charge the shutter 8 and transport the film 9. The film-travel detecting circuit 109 detects whether the film 9 has been wound by one frame during a film transport, and sends a signal indicative of the detection result to the camera microcomputer 100.

When a release button (not shown) is pressed to a first stroke position, a switch SW1 is turned on to start a light measuring operation and an automatic focusing (AF) operation. When the release button is pressed to a second stroke position, a switch SW2 is turned on to start an exposure operation. A switch SWFELK is turned on through a push switch (not shown) to start the operation of causing the flash device 18 to perform a preliminary light emission before an exposure operation and determining and locking the amount of light emission of a main light emission.

The switch sensing circuit 110 senses signals supplied from the switches SW1, SW2 and SWFELK and other camera operating members (not shown) and sends the signals to the camera microcomputer 100. A switch SWX is turned on when the shutter 8 is fully opened, and transmits the light emission timing of a main light emission to the flash device 18 during an exposure operation.

The liquid crystal display circuit 111 controls the display of an intra-viewfinder LCD 41 and that of a monitoring LCD 42 which is not shown in FIG. 2, in accordance with a signal from the camera microcomputer 100. The camera microcomputer 100 can obtain the measured-light information of the light-on-film-surface measuring sensor 24 through a film-surface-reflected light measuring circuit 114.

Similarly to the multiple divided light measuring sensor 7, the light-on-film-surface measuring sensor 24 divides the image plane into a plurality of areas as shown in FIG. 4, and is capable of measuring the luminances of the respective areas which are conjugationally related to the photographic image plane.

The arrangement of the lens barrel 11 will be described below. The camera body 1 and the lens barrel 11 are electrically connected to each other via the mount contact group 10. The mount contact group 10 includes a power supply contact L0 for the focusing driving motor 16 and the lens diaphragm driving motor 17 both of which are provided in the lens barrel 11, a power supply contact L1 for the lens microcomputer 112, a clock-signal contact L2 for communication of known serial data, a contact L3 for transmission of data from the camera body 1 to the lens barrel 11, a contact L4 for transmission of data from the lens barrel 11 to the camera body 1, a motor grounding contact L5 for a motor power supply, and a grounding contact L6 for a power supply of the lens microcomputer 112.

The lens microcomputer 112 is connected to the camera microcomputer 100 via the mount contact group 10, and operates the focusing driving motor 16 and the diaphragm driving motor 17 to adjust the focus of the photographing lens and control the diaphragm 15 thereof. The lens microcomputer 112 counts the number of pulses of a pulse plate 36 through an optical detector 35 and can obtain information indicative of the position of the first lens group 12 to perform focus adjustment of the photographing lens or transmit information indicative of the absolute distance of a subject to the camera microcomputer 100.

The arrangement of the flash device 18 will be described below with reference to FIG. 3.

The flash-device microcomputer 200 is a circuit which performs control of the flash device 18 in accordance with a signal from the camera microcomputer 100, and performs various kinds of control, such as control of the amount of light emission, control of the light emission intensity and the light emission time of a flat light emission, and control of the illuminating angle of a light emission.

A DC/DC converter 201 boosts a battery voltage to several hundred volts and charges a main capacitor C1, in accordance with an instruction given by the flash-device microcomputer 200.

Voltage dividing resistors R1 and R2 are provided so that the flash-device microcomputer 200 can monitor the voltage of the main capacitor C1. The flash-device microcomputer 200 performs A/D conversion of a divided voltage supplied from the resistors R1 and R2, through an A/D converter (not shown) built in the flash-device microcomputer 200, and indirectly monitors the voltage of the main capacitor C1 to control the operation of the DC/DC converter 201 and control the voltage of the main capacitor C1 to set it to a predetermined voltage.

At the time of a light emission of the flash device 18, a trigger circuit 202 outputs a trigger signal via the flash-device microcomputer 200 in response to an instruction given by the camera microcomputer 100 or a signal received from the switch SWX and applies a high voltage of several thousand volts to a trigger electrode of the xenon tube 19 to induce an electric discharge of the xenon tube 19. Thus, the charge energy stored in the main capacitor C1 is discharged via the xenon tube 19 as light energy.

A light emission control circuit 203 employs a switching element such as an IGBT (insulated-gate bipolar transistor). When a trigger voltage for starting a light emission is applied to the light emission control circuit 203, the light emission control circuit 203 becomes conductive and allows a current to flow through the xenon tube 19. When the light emission control circuit 203 becomes nonconductive and shuts off the flow of a current through the xenon tube 19, the light emission of the xenon tube 19 is made to stop.

A comparator 204 is employed for stopping a light emission at the time of a flash light emission which will be described later, while a comparator 205 is employed for controlling a light emission intensity at the time of a flat light emission which will be described later. A data selector 206 selects an input from among the inputs applied to terminals D0 to D2, in accordance with selecting signals SEL0 and SEL1 supplied from the flash-device microcomputer 200, and outputs the selected input to a terminal Y.

A flash-light-emission controlling monitor circuit 207 logarithmically compresses and amplifies the output of the sensor 31. An integrating circuit 208 integrates the output of the flash-light-emission controlling monitor circuit 207. A flat-light-emission controlling monitor circuit 209 amplifies the output of the sensor 32. An EEPROM 210 serves as memory means for memorizing the light emission time of the flat light emission and the like.

The illuminating-angle (flash zoom) adjusting mechanism 34 includes a known motor driver 211, a flash zoom driving motor 212, a pinion gear 213, a rack gear 214, a flash zoom position detecting encoder 215 for detecting the position of the reflector 20 and the like. An LED 216 indicates whether a light emission is possible.

A switch SWB is a switch for detecting whether the flash device 18 is in the bounce photography mode. A switch SWT is interlocked with a multiple-flash setting button (not shown), and if a photographer operates a multiple-flash setting button (not shown) in order to perform photography using a plurality of flash devices, i.e., so-called multiple-flash photography, the flash-device microcomputer 200 performs setting of the multiple-flash photography. A switch SWMZ is interlocked with a manual-zoom setting button (not shown), and when a lens whose focal length information cannot be automatically detected is used or when the photographer is to perform photography using a special effect such as the effect of intentionally illuminating a subject with a spot-shaped flash light at a flash illuminating angle different from a photographic angle of view, if the photographer operates the manual-zoom setting button, the flash-device microcomputer 200 operates the illuminating-angle adjusting mechanism 34 to perform setting of an illuminating angle which the photographer desires to set.

Each terminal of the flash-device microcomputer 200 will be described below.

The flash-device microcomputer 200 includes an input terminal CK through which to input a synchronizing clock signal required for the flash-device microcomputer 200 to perform serial communication with the camera body 1, an input terminal D1 through which to input serial communication data, an output terminal D0 through which to output serial communication data, an output terminal CHG through which to transmit a light-emission-possible or light-emission-impossible state of the flash device 18 to the camera body 1 by means of an electric current, and an input terminal X through which to input a light emission timing signal from the camera body 1, an output terminal ECK through which to output a communication clock signal required for the flash-device microcomputer 200 to perform serial communication with writable memory means 210 such as an EEPROM or a flash ROM externally connected to the flash-device microcomputer 200, an input terminal EDI through which to input serial data from the memory means 210, an output terminal EDO through which to output serial data to the memory means 210, and an enable terminal SELE through which to output a signal which enables or disables communication with the memory 210. If a low-level signal is outputted through the enable terminal SELE, the communication with the memory 210 is set to an enabled state, whereas if a high-level signal is outputted through the enable terminal SELE, the communication with the memory 210 is set to a disabled state. Although in the first embodiment the memory means 210 is provided outside the flash-device microcomputer 200, the memory means 210 may, of course, be built in the flash-device microcomputer 200.

The flash-device microcomputer 200 also includes an input terminal POW through which to input a state of a power switch 217, an output terminal OFF through which to output a signal to turn off the flash device 18, when connected to the power switch 217, and an output terminal ON through which to output a signal to turn on the flash device 18, when connected to the power switch 217. If the power switch 217 is turned on, the input terminal POW is connected to the output terminal ON, and the impedance at the output terminal ON becomes high while the impedance at the output terminal OFF becomes low. If the power switch 217 is turned off, the input terminal POW is connected to the output terminal OFF, and the impedance at the output terminal ON becomes low while the impedance at the output terminal OFF becomes high. The flash-device microcomputer 200 also includes a display output terminal LED for providing a display indicating that a light emission is possible.

The flash-device microcomputer 200 also includes an input terminal STOP through which to input a light emission stop signal. For the convenience of description, it is assumed that if a low-level signal is inputted through the input terminal STOP, the flash-device microcomputer 200 stops the light emission of the flash device 18. The flash-device microcomputer 200 also includes output terminals SEL0 and SEL1 for instructing the data selector 206 to select a particular input from among the inputs D0 to D2. If low-level signals are outputted from the respective output terminals SEL0 and SEL1, the terminal D0 is connected to a terminal Y; if low- and high-level signals are outputted from the respective output terminals SEL0 and SEL1, the terminal D1 is connected to the terminal Y; and if high- and low-level signals are outputted from the respective output terminals SEL0 and SEL1, the terminal D2 is connected to the terminal Y.

A terminal DAO is the output terminal of a D/A converter built in the flash-device microcomputer 200, and a comparison level for each of the comparators 204 and 205 is outputted from the output terminal DAO in the form of an analog voltage. A terminal TRIG is an output terminal through which to output a trigger signal which instructs the trigger circuit 202 to trigger a light emission. A terminal CNT is an output terminal through which to output a signal for controlling the start and the stop of an oscillation of the DC/DC converter 201. For the convenience of description, it is assumed that if a high-level signal is outputted from the output terminal CNT, the DC/DC converter 201 starts charging the main capacitor C1, and if a low-level signal is outputted from the output terminal CNT, the DC/DC converter 201 stops charging the main capacitor C1. A terminal INT is an output terminal through which to output a signal for controlling the start and the reset of an integration of the integrating circuit 208. If a high-level signal is outputted from the output terminal INT, the integration is reset, whereas if a low-level signal is outputted from the output terminal INT, the integration is enabled.

A/D input terminals AD0 and AD1 convert input voltages into digital data which can be processed in the flash-device microcomputer 200. The input terminal AD0 is provided for monitoring the voltage of the main capacitor C1, while the input terminal AD1 is provided for monitoring the integral output voltage of the integrating circuit 208.

The flash-device microcomputer 200 also includes control output terminals Z0 and Z1 through which to control the motor driver 211 for driving the flash zoom driving motor 212, input terminals ZM0, ZM1 and ZM2 through which to input signals outputted from the flash zoom position detecting encoder 215, and a common terminal COMO through which to input a current equivalent to the ground level of the flash zoom position detecting encoder 215.

A terminal BOUNCE is a port through which to input a signal indicating whether the flash device 18 is in the bounce photography mode. A terminal TATOU is an input port through which to input a signal from a setting switch for multiple-flash photography. A terminal M_Zoom is an input port through which to input a signal from a setting switch for manual zoom.

Individual operations of the flash device 18 as well as the operation of the circuit shown in FIG. 3 will be described below.

<Detection of Whether Light Emission is Possible>

The flash-device microcomputer 200 performs A/D conversion of a divided voltage of the main capacitor C1 which has been inputted through the terminal AD0. If the flash-device microcomputer 200 determines that the voltage of the main capacitor C1 is not less than a predetermined voltage at which a light emission is possible, the flash-device microcomputer 200 draws a predetermined current through the terminal CHG to inform the camera body 1 that a light emission is possible, and sets the terminal LED to a high level. Thus, the LED 216 emits light to indicate that the light emission is possible.

If the flash-device microcomputer 200 determines that the voltage of the main capacitor C1 is less than the predetermined voltage, the flash-device microcomputer 200 makes the terminal CHG inactive and shuts off the flow of the predetermined current to inform the camera body 1 that a light emission is impossible, and sets the terminal LED to a low level. Thus, the LED 216 is turned off to indicate that the light emission is impossible.

<Setting of Flash Illuminating Angle>

The flash-device microcomputer 200 reads the current flash zoom position through the terminals ZM0 to ZM2, and outputs predetermined signals to the motor driver 211 through the terminals Z0 and Z1 and drives the flash zoom driving motor 212 so that the flash zoom position can be set to a flash zoom position specified by the camera body 1 through a serial communication.

Otherwise, if the photographer manually sets a flash illuminating angle through the manual-zoom setting button (not shown), the flash-device microcomputer 200 drives the motor driver 211 so that a predetermined zoom position is obtained, in accordance with a signal applied to the terminal M_Zoom.

<Preliminary Flat Light Emission>

If the flash device 18 is in the light-emission-possible state, the camera body 1 communicates the light emission intensity and the light emission time of a preliminary light emission to the flash device 18, and can instruct the flash device 18 to execute the preliminary light emission.

The flash-device microcomputer 200 sets a predetermined voltage at the terminal DAO according to a predetermined light emission intensity signal transmitted from the camera body 1, and then outputs low- and high-level signals through the respective terminals SEL0 and SEL1 to select the terminal D1. At this time, since the xenon tube 19 has not yet started a light emission, a substantial amount of photoelectric current does not flow in the monitor sensor 32 and the monitor circuit 209 does not output a signal to be applied to the inverting input terminal of the comparator 205, so that the output of the comparator 205 goes to its high level and the light emission control circuit 203 is brought to a conductive state. When a trigger signal is outputted from the terminal TRIG, the trigger circuit 202 generates a high voltage to excite the xenon tube 19, so that the flash device 18 starts a light emission.

In the meantime, when a predetermined time passes after the trigger circuit 202 has generated the trigger signal, the flash-device microcomputer 200 instructs the integrating circuit 208 to start an integration, and the integrating circuit 208 starts to integrate the output of the monitor circuit 207, i.e., a logarithmically compressed photoelectric output of the monitor sensor 31 for integrating the amount of light. At the same time, the flash-device microcomputer 200 activates a timer for counting a predetermined time.

When the preliminary light emission is started, the amount of photoelectric current in the monitor sensor 32 for controlling the light emission intensity of the flat light emission increases and the output voltage of the monitor circuit 209 rises. When this output voltage becomes higher than a predetermined comparison voltage which is set at the non-inverting input terminal of the comparator 205, the output of the comparator 205 is inverted to a low level and the light emission control circuit 203 shuts off the light emission current of the xenon tube 19. Thus, the discharge loop of the xenon tube 19 is shut down, but since a circulating current loop is formed by a diode D1 and a coil L1, the light emission current gradually decreases after an overshoot due to a circuit delay has settled. Since the light emission intensity falls with the decrease in the light emission current, the photoelectric current of the monitor sensor 32 decreases and the output of the monitor circuit 209 falls. If this output falls below the predetermined comparison level, the output of the comparator 205 is inverted to a high level and the light emission control circuit 203 again becomes conductive to form the discharge loop of the xenon tube 19, so that the light emission current increases and the light emission intensity also increases. In this manner, the output level of the comparator 205 is repeatedly inverted on the basis of the predetermined comparison voltage set at the terminal DAO to cause the light emission intensity to repeatedly increase and decrease at intervals of a short period, so that the control of the flat light emission of continuing a light emission at a desired approximately constant light emission intensity is effected.

When the aforesaid light emission time timer counts up and a predetermined preliminary light emission time passes, the flash-device microcomputer 200 sets low- and low-level signals at the respective terminals SEL1 and SEL0.

Thus, the data selector 206 selects the terminal D0, i.e., the low-level input, and the output of the data selector 206 is forcedly set to its low level, so that the light emission control circuit 203 shuts off the discharge loop of the xenon tube 19 and brings the preliminary light emission to an end.

At the time of the end of the preliminary light emission, the flash-device microcomputer 200 reads through the input terminal AD1 the integral output of the integrating circuit 208 in which an integration of the preliminary light emission has been performed, and performs A/D conversion of the read integral output and obtains an integral value, i.e., the amount of light emission of the preliminary light emission, as a digital value "INTp".

<Main Light Emission Control>

The camera microcomputer 100 obtains a correct relative value "γ" of the amount of light emission of a main light emission with respect to the amount of light emission of a preliminary light emission, from a luminance value of subject-reflected light or the like which is supplied from the multiple divided light measuring sensor 7 during the preliminary light emission. The camera microcomputer 100 sends the correct relative value "γ" to the flash-device microcomputer 200.

The flash-device microcomputer 200 obtains a correct integral value "INTm" by multiplying the correct relative value "γ" sent from the camera body 1 by an integral value "INTp" of the measured light value of the preliminary light emission, and sets the correct integral value "INTm" at the terminal DAO.

Then, the flash-device microcomputer 200 sets high- and low-level signals at the respective terminals SEL1 and SEL0 to select the terminal D2. At this time, since the integrating circuit 208 is placed in an operation-inhibited state, the integrating circuit 208 does not produce an output to be applied to the inverting input terminal of the comparator 204. Therefore, the output of the comparator 204 goes to a high level and the light emission control circuit 203 becomes conductive. Then, when the flash-device microcomputer 200 outputs a trigger signal from the terminal TRIG, the trigger circuit 202 generates a high voltage and excites the xenon tube 19 to cause it to start a light emission. The flash-device microcomputer 200 sets a low-level signal at the integration start terminal INT when an actual light emission is started over 10 μsec after trigger noise due to the application of the trigger signal has been settled. Thus, the integrating circuit 208 integrates the output from the monitor sensor 31 via the monitor circuit 207. When the integral output of the integrating circuit 208 reaches the predetermined voltage set at the terminal DAO, the comparator 204 is inverted and the conduction of the light emission control circuit 203 is shut off via the data selector 206 to stop the light emission of the xenon tube 19. In the meantime, the flash-device microcomputer 200 monitors the state of the input terminal STOP. When the input level at the input terminal STOP is inverted and the light emission is stopped, the flash-device microcomputer 200 sets low- and low-level signals at the terminals SEL1 and SEL2 to set a forcedly light emission inhibited state. In addition, the flash-device microcomputer 200 inverts the level at the integration start terminal INT to bring the integration as well as the entire light emission processing to an end. In the above-described manner, the main light emission can be controlled to provide a correct amount of light emission.

The operation flow of the camera system according to the first embodiment will be described below with reference to FIGS. 6 and 7, and the following description is mainly focused on the operation of the camera microcomputer 100.

Figure 6:
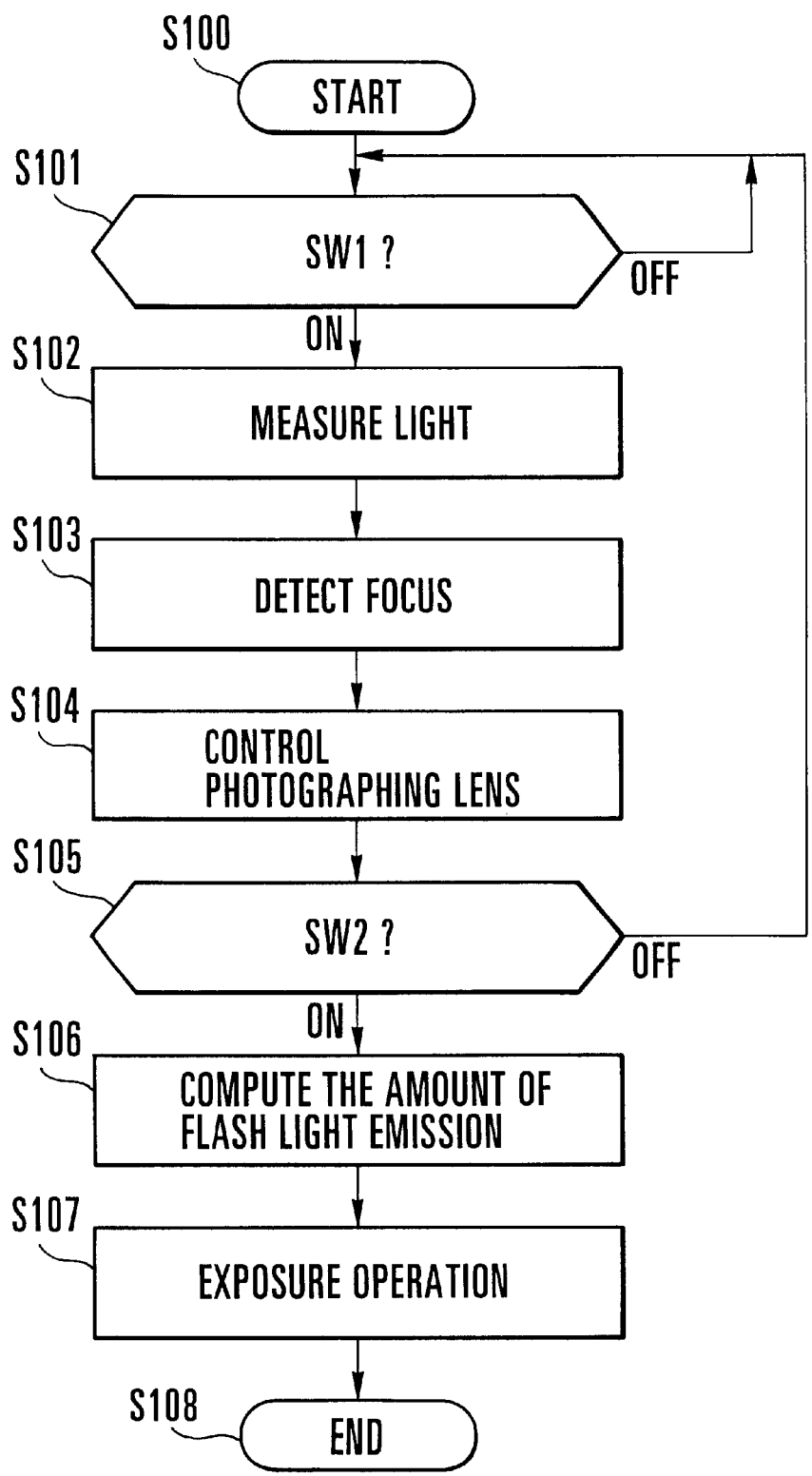
FIG. 6 is a flowchart showing the operation of the camera system according to the first embodiment.

[S101] When the operation of the camera system is started in Step S100 of FIG. 6, the process proceeds to Step S101, in which the camera microcomputer 100 detects the state of the switch SW1 which is turned on when the release button is pressed to the first stroke position. If the switch SW1 is off, Step S101 is repeated. If the switch SW1 is on, the process proceeds to Step S102.

[S102] The camera microcomputer 100 obtains by A/D conversion the subject luminance information of each of the plurality of areas in the image plane through the light measuring circuit 106. The camera microcomputer 100 computes a shutter speed and an aperture value to be used in an exposure operation which will be described later, from such subject luminance information.

[S103] The camera microcomputer 100 drives the focus detecting circuit 105 to perform a focus detecting operation using a known phase-difference detecting method.

Since a plurality of points for focus detection (distance measuring points) are provided on the image plane as described previously, it is possible to adopt, for example, a system which allows a photographer to arbitrarily set a desired distance measuring point, or a known automatic selection algorithm system based on the concept of nearest-point priority.

[S104] The camera microcomputer 100 communicates with the lens barrel 11 to perform focus adjustment of the photographing lens so that a selected distance measuring point is brought into focus.

In addition, the camera microcomputer 100 can obtain absolute distance information relative to an in-focus position of the photographing lens through the communication with the lens barrel 11.

[S105] The camera microcomputer 100 determines whether the switch SW2 is on, the switch SW2 being turned on when the release button is pressed to the second stroke position. If the switch SW2 is off, the camera microcomputer 100 repeats the operation of Steps S101 to S104, whereas if the switch SW2 is on, the process proceeds to a shutter release operation which starts with Step S106.

[S106] When the shutter release operation is started, the camera microcomputer 100 calls an amount-of-flash-light-emission computing subroutine.

The amount-of-flash-light-emission computing subroutine will be described below with reference to FIG. 7.

[S201] The camera microcomputer 100 obtains a subject luminance from the light measuring circuit 106 immediately before a preliminary light emission. The obtained subject luminance values for the respective areas are memorized in a RAM as EVa (i) (i=0 to 18).

[S202] The camera microcomputer 100 transmits to the flash device 18 an instruction to execute the preliminary light emission. The flash-device microcomputer 200 performs a preliminary light emission operation in the above-described manner in accordance with the instruction.

While the flat light emission of the preliminary light emission is being sustained, the camera microcomputer 100 obtains a subject luminance from the light measuring circuit 106. The obtained subject luminance values are memorized in the RAM as EVf (i) (i=0 to 18).

[S203] The camera microcomputer 100 extracts the luminance values of only preliminary-emission reflected light components from the luminance values EVa and EVf. The obtained luminance values are memorized in the RAM as EVdf (i)←EVf(i)−EVa(i) (i=0 to 18).

[S204] The camera microcomputer 100 selects a central area on which to perform a computation to correctly control the amount of flash light emission.

Figures 10, 11:
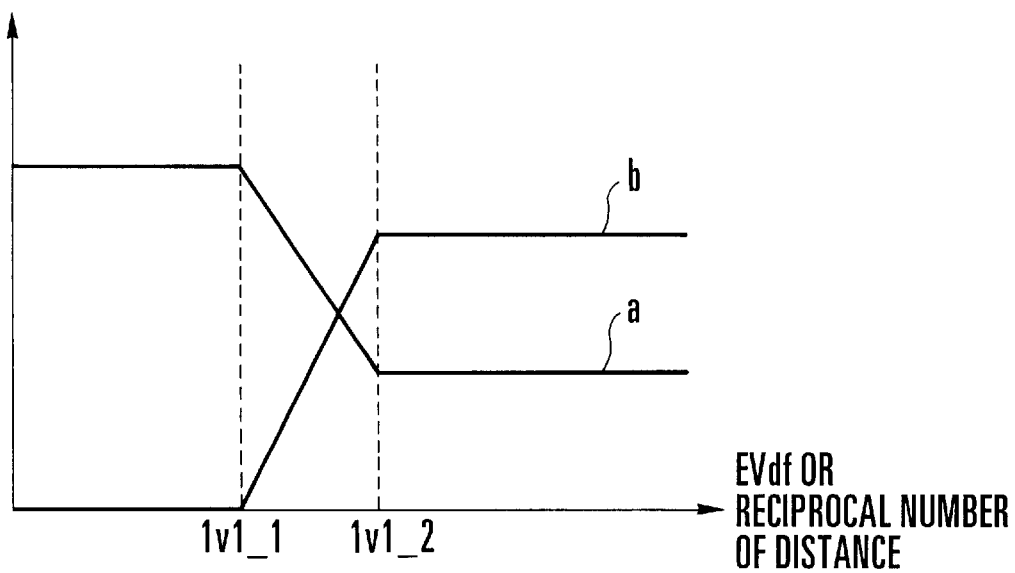
FIG. 10 is a graph for determining weighting coefficients in the first embodiment.
FIG. 11 is a table showing how to select areas on which to perform weighting averaging in the camera system according to the first embodiment.

As such central area, the aforesaid selected distance measuring point may be used or an area may be selected whose luminance value EVdf is a maximum which indicates that the subject is closest to the camera. After the central area has been selected, the camera microcomputer 100 selects other areas to be used for a weighting computation which will be described later, as shown in FIG. 11. Although, in the example shown in FIG. 11, such other areas neighbor the central area on which to perform a computation, the areas to be used for a weighting computation, of course, are not limited to the neighboring areas, and all the remaining areas may also be used. The number of central areas on which to perform a computation may also be two or more.

[S205] The camera microcomputer 100 computes and determines weighting coefficients "a" and "b" from magnification information relative to the subject (for example, information relative to the distance to the subject).

The magnification information relative to the subject uses the luminance value EVdf of the central area selected in Step S204. Since the luminance value EVdf is obtained from only the preliminary-emission reflected light component, if the magnification of the subject becomes ½, the light reflected from the subject is reduced and the luminance value EVdf becomes ¼.

FIG. 10 is a graph showing a method of determining the weighting coefficients "a" and "b". The weighting coefficient "a" is a weighting coefficient relative to the central area on which to perform a computation, and the weighting coefficient "b" is a weighting coefficient relative to the other areas.

As the magnification of the subject becomes larger and the luminance value Evdf becomes larger, the weighting coefficient "a" is made smaller, while the weighting coefficient "b" is made larger. Conversely, as the magnification of the subject becomes smaller and the luminance value Evdf becomes smaller, the weighting coefficient "a" is made larger, while the weighting coefficient "b" is made smaller. However, since the manner of determining the weighting coefficients "a" and "b" is based on a standard photographing operation, the values of the weighting coefficients "a" and "b" are reasonably likely to vary during special photography such as bounce flash photography, multiple-flash photography, wireless flash photography or macrophotography.

Such data relative to the distance to the subject may simply use absolute distance information obtained when the camera microcomputer 100 communicated with the lens barrel 11 in Step S104.

[S206] The camera microcomputer 100 performs a computation on the amounts of flash light emissions which can achieve correct exposures for the respective areas selected in Step S204 to be used for weighting averaging.

$$P=\{TGT-EVa(i)\}/EVdf(i),$$

TGT: the amount of correct exposure or the amount of exposure determined from a shutter time and an aperture value at the time of actual photography;

EVa: the luminance of a subject due to external light;

EVdf: the luminance of only a preliminary-emission reflected light component; and P: the amount of correct flash light emission for each of the areas.

Both the value $P(d_i)$ of the selected central area(s) and the value $P(P_B)$ of the other areas are obtained from the values P of the respective areas by simple averaging. (If one central area is selected, the value of the one central area is used as the average thereof.)

For example, if the area A4 is selected as the central area and the areas A0, A3, A5, A12, A13 and A14 are selected as the neighboring areas, $$P_A=\{TGT-EVa(4)\}/EVdf(4), \text{ and}$$

$$P_B=(P_0+P_3+P_5+P_{12}+P_{13}+P_{14})/6$$

Then, a weighting averaging is performed in accordance with the following equation:

$$\text{Wave}=a \times P_A + b \times P_B (a \text{ and } b \leq 1).$$

[S207] The camera microcomputer 100 performs a computation to convert the value Wave into the correct relative value "γ", and sends the correct relative value "γ" to the flash device 18 by communication.

Thus, the amount-of-flash-light-emission computing subroutine is completed, and the process returns to the flowchart of FIG. 6.

[S107] The camera microcomputer 100 performs an exposure operation.

Specifically, the camera microcomputer 100 moves up the main mirror 2 and retracts the main mirror 2 from the photographing optical path together with the sub-mirror 25, controls the diaphragm 15, and controls the shutter control circuit 107 so that the determined shutter speed "TV" is achieved. At this time, when the switch SWX is turned on in synchronism with the timing at which the shutter 8 is fully opened, the signal SWX is transmitted to the flash device 18 as an instruction to execute the main light emission. The flash-device microcomputer 200 performs the above-described main light emission control so that a correct amount of light emission can be achieved, on the basis of the correct relative ratio "γ" sent from the camera body 1.

Finally, the camera microcomputer 100 moves down the main mirror 2 and the like which have been retracted from the photographing optical path, thereby again obliquely inserting the main mirror 2 and the like into the photographing optical path. The camera microcomputer 100 winds the film 9 by one frame by means of the motor control circuit 108 and the film-travel detecting circuit 109.

The effects of the first embodiment will be described below with reference to FIGS. 5(a) and 5(b) which show different photographic scenes by way of example.

Figure 5A:
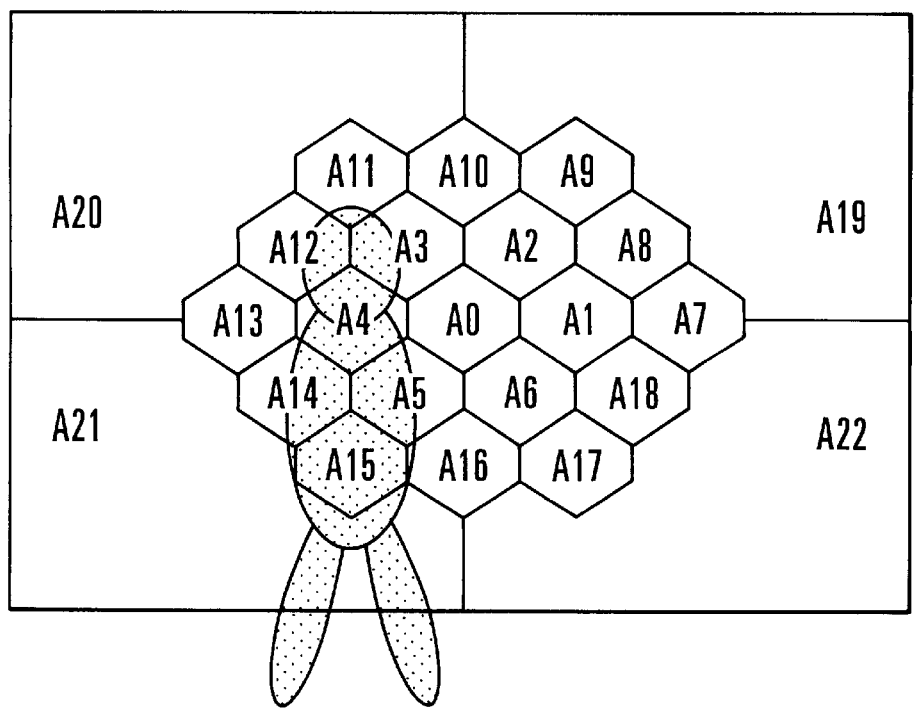
FIGS. 5(a) and 5(b) are schematic views showing the relation between subject distance and multiple divided light measuring areas in the first embodiment.

In the scene shown in FIG. 5(a), since a subject is somewhat distant from the camera system and the magnification of the subject is small, the weighting coefficient "a" for the central area A is made as large as possible on the basis of the amounts of subject-reflected light of the preliminary light emission (EVdf) relative to the computational central area A4 and the neighboring areas A0, A3, A5, A12, A13 and A14. In this setting, the influence of areas which are offset from the subject so that the subject-reflected light of the preliminary light emission does not return to the camera system is decreased, and the flash device 18 is controlled so that flash light is prevented from causing an overexposure.

Figure 5B:
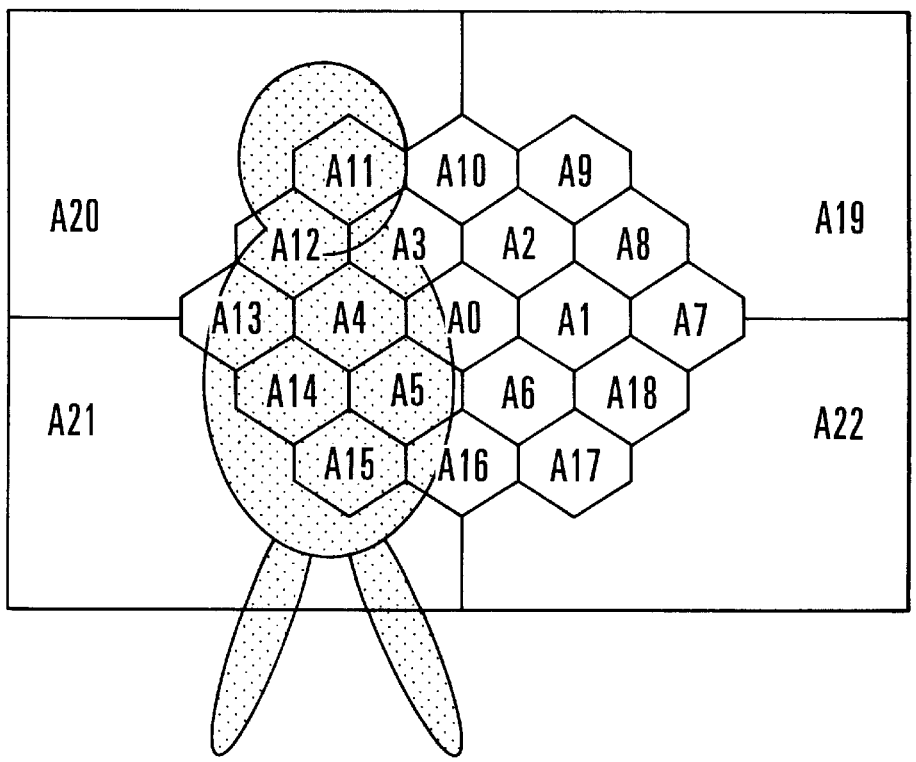

In the scene shown in FIG. 5(b), since the subject is closer to the camera system and the magnification of the subject is larger, the weighting coefficient "a" for the central area A is made as small as possible on the basis of the amounts of subject-reflected light of the preliminary light emission (EVdf) relative to the computational central area A4 and the neighboring areas A0, A3, A5, A12, A13 and A14. Since luminance values relative to the areas on which to perform a computation are averaged and evaluated to determine the amount of flash light emission, it is possible to effect correct flash exposure control even for a difficult scene in which a subject to be photographed wears clothes having colors of extremely different reflectances such as white and black.

In addition, even when a specular reflection from glass or the like enters the image plane and it is mistakenly determined from the value EVdf that a subject is close to the camera system, the average of the luminance values of a plurality of areas is calculated so that an extreme under exposure is prevented. In other words, it is possible to obtain flash exposure levels which are stable at all times and applicable to a wide variety of scenes.

Figure 7:
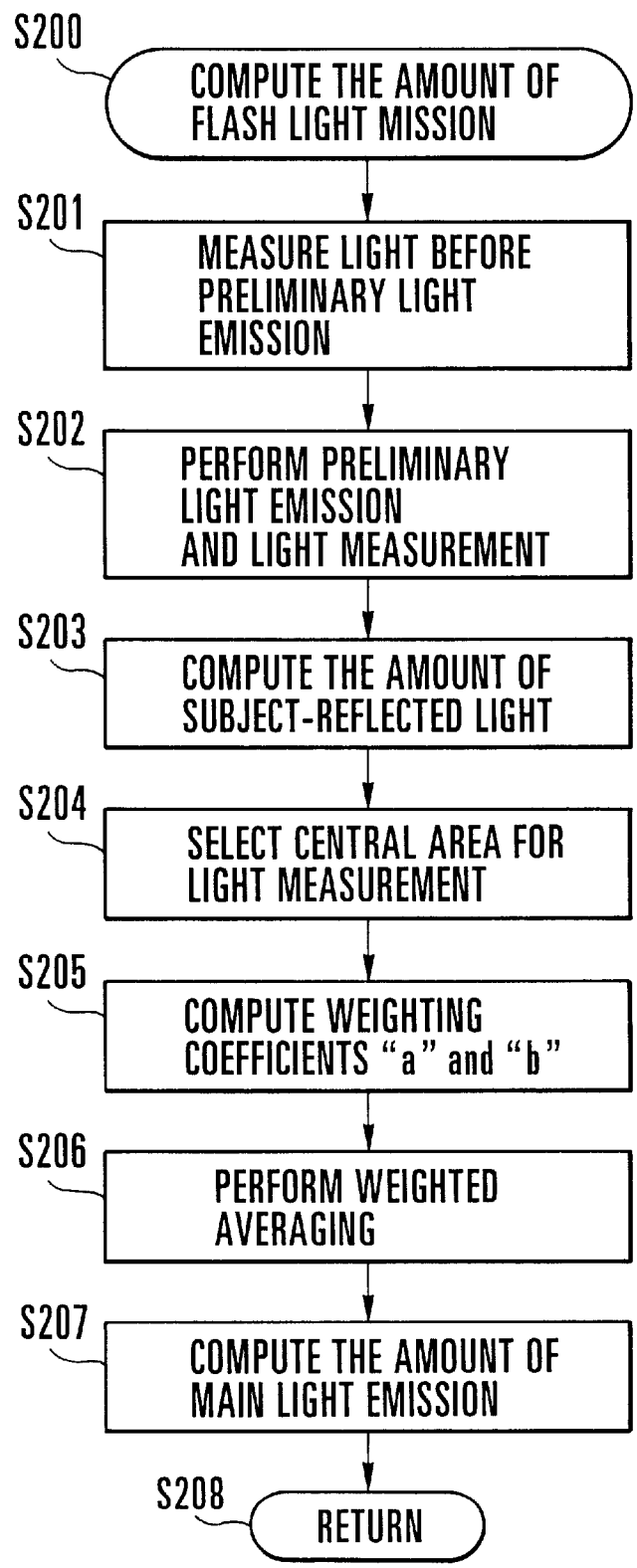
FIG. 7 is a flowchart showing the operation of the camera system according to the first embodiment.
Figure 8:
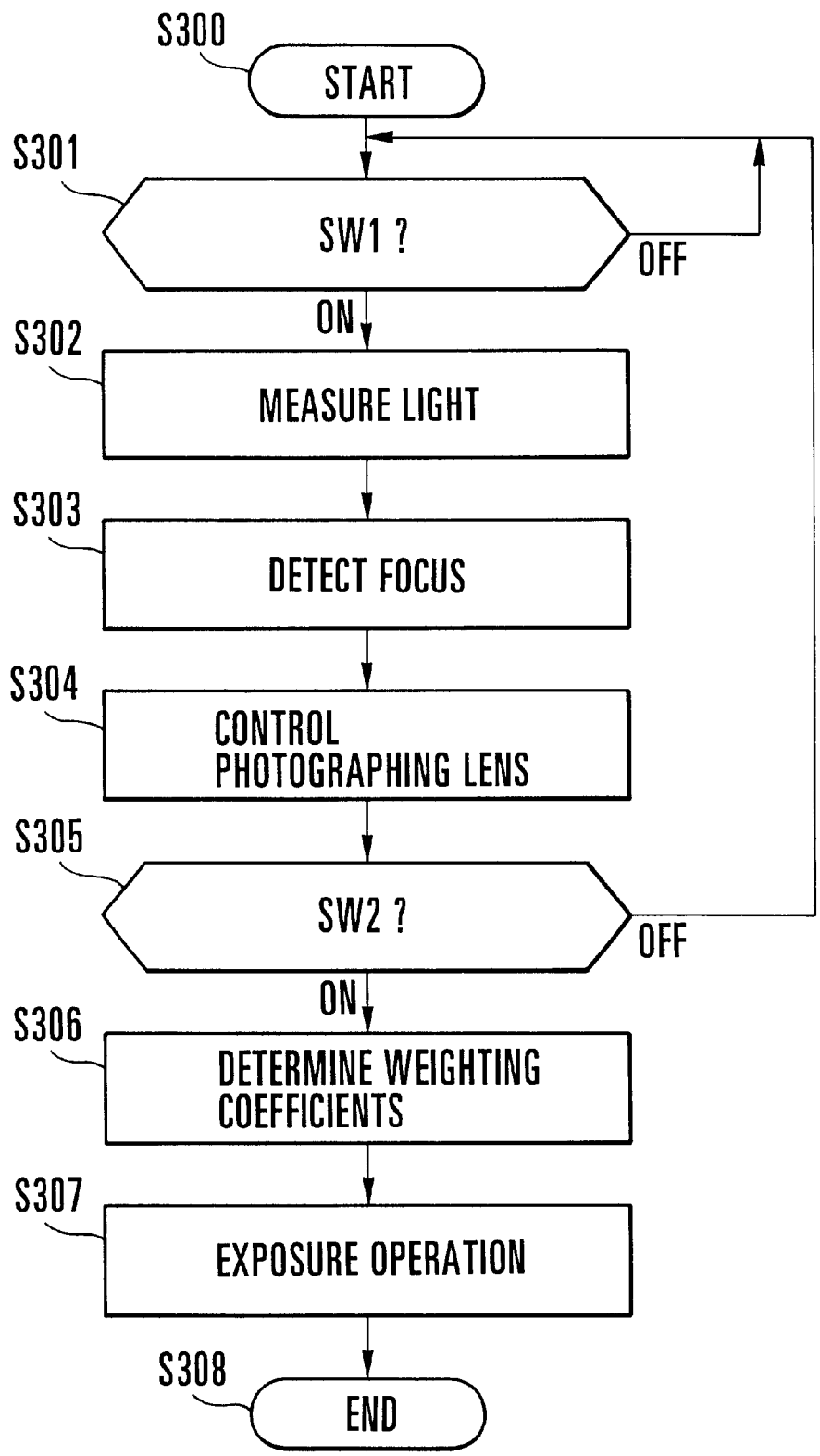
FIG. 8 is a flowchart showing the operation of a camera system having a flash device according to a second embodiment of the present invention.
Figure 9:
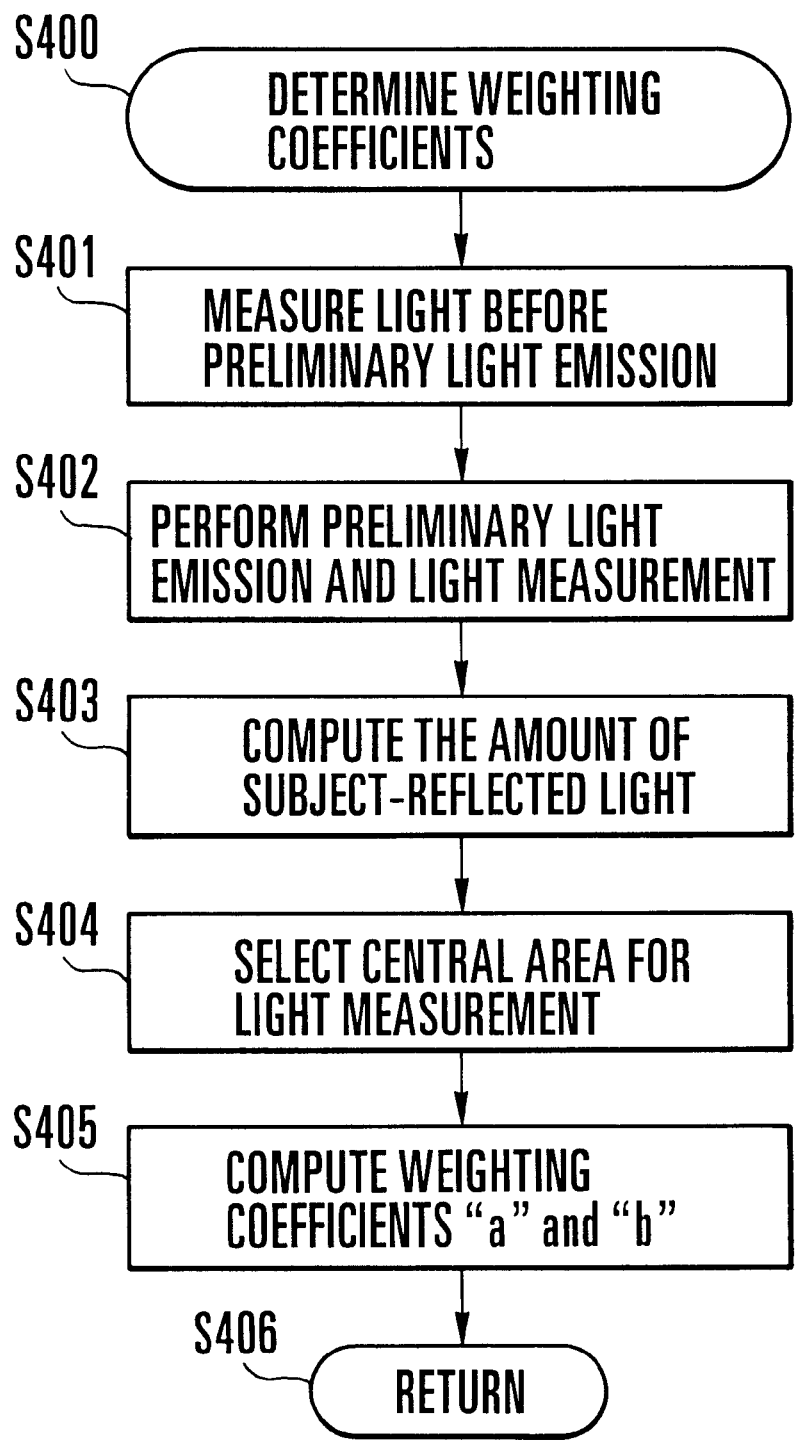
FIG. 9 is a flowchart showing the operation of the camera system according to the second embodiment of the present invention.

FIGS. 8 and 9 show a second embodiment of the present invention. FIGS. 8 and 9 show the flowchart of the operation of a camera which performs control of the amount of flash light emission by finally measuring film-surface-reflected light. In the following description, the description of steps which are common to those shown in FIGS. 6 and 7 is omitted for the sake of simplicity.

[S301 to S305] Steps S301 to S305 are substantially identical to Step S101 to S105 of FIG. 6, and the description of Steps S301 to S305 is omitted.

[S306] When the release operation is started, the camera microcomputer 100 calls a weighting coefficient computing subroutine.

The weighting coefficient computing subroutine is as shown in FIG. 9.

[S401 to S405] Steps S401 to S405 are substantially identical to Step S201 to S205 of FIG. 7, and the description of Steps S401 to S405 is omitted.

When the weighting coefficient computing subroutine is completed, the process returns to FIG. 8.

[S307] The camera microcomputer 100 performs an exposure operation. Although Step S307 is substantially identical to Step S107, the way of controlling the amount of flash light emission differs between Step S307 and Step S107.

When the switch SWX is turned on in synchronism with the timing at which the shutter 8 is fully opened, the signal SWX is transmitted to the flash device 18 and a main light emission is started. At the same time, the light-on-film-surface measuring sensor 24 starts a light measurement integration.

The camera microcomputer 100 adds together the measured-light integral values (P1 and P2) of the light-on-film-surface measuring sensor 24 relative to the central area and the other areas which have been selected in Step S404 to perform a computation, by using the following equation using the weighting coefficients "a" and "b" determined in step S405:

Wsum=a×P1+b×P2 (a and b≦1).

Then, when the value Wsum reaches a predetermined value, the light emission of the flash device 18 is made to stop.

Similarly to the effect of the first embodiment, the effect of the second embodiment resides in the fact that it is possible to obtain flash exposure levels which are stable at all times and applicable to a wide variety of scenes. Furthermore, the second embodiment has the advantage that since the flash-light-emission controlling monitor circuit 207 of the flash device 18 and other associated elements are not needed, a simple circuit is achieved.

Although the first and second embodiments have been described above on the assumption that the main light emission is the flash light emission, the present invention can also be applied to a flat light emission in which uniform peak values continuously appear. In addition, the present invention can, of course, be applied to not only a detachable type of flash device but also a flash device of the type built in a camera body.

What is claimed is:

1. A flash photography system which performs a preliminary light emission and performs control of a main light emission on the basis of a measured-light value obtained during the preliminary light emission, comprising:
   a) light measuring circuit which divides an image plane into a plurality of areas and performs light measurements relative to the plurality of areas, respectively:
   b) a designation circuit which designates a predetermined area of said plurality of areas as a first area, and designates another predetermined area as a second area;
   c) a difference computing circuit which computes information of a difference between the light measurement value in said first area during said preliminary light emission and the light measurement value in said first area when the preliminary light emission is not performed;
   d) a weighting circuit which weights data relative to a light measurement value in the first area and data relative to a light measurement value in the second area, respectively according to the difference information formed by said difference computing circuit; and
   e) a control circuit which controls the main light emission on the basis of each of the weighted data.

2. A flash photography system according to claim 1, wherein the first area is an area in the image plane for which focusing is performed.

3. A flash photography system according to claim 1, wherein the second area has a plurality of areas which neighbor the first area.

4. A flash photography system according to claim 3, wherein the first area is an area in the image plane for which focusing is performed.

5. A flash photography system according to claim 1, wherein the first area is an area which is determined according to measured-light values which are respectively obtained from the plurality of areas by said light measuring circuit during the preliminary light emission.

6. A flash photography system according to claim 5, wherein the second area has a plurality of areas which neighbor the first area.

7. A flash photography system according to claim 1, wherein said control circuit includes measuring means for measuring an amount of light emission during the preliminary light emission, said control circuit being arranged to compute an amount of light emission of the main light emission on the basis of first data obtained by the data relative to the light measurement value in the first area being weighted by said weighting means and second data obtained by the data relative to the light measurement value in the second area being weighted by said weighting means as well as the amount of light emission measured by said measuring means, and perform control of the amount of light emission of the main light emission so that the amount of light emission of the main light emission becomes the computed amount of light emission.

8. A flash photography system according to claim 1, wherein said control circuit includes a main-light-emission light measuring circuit for performing light measurement of areas respectively corresponding to the first area and the second area in the image plane during the main light emission, and a light emission stopping circuit for stopping the main light emission when an information value obtained by weighting and summing measured-light information obtained from the areas in said main-light-emission light measuring circuit reaches a predetermined value.

* * * * *

UNITED STATES PATENT AND TRADEMARK OFFICE
CERTIFICATE OF CORRECTION

PATENT NO.     : 6,349,175 B1
DATED          : February 19, 2002
INVENTOR(S)    : Tatsuyuki Tokunaga It is certified that error appears in the above-identified patent and that said Letters Patent is hereby corrected as shown below:

Column 6,
Line 24, delete "LO" and insert -- L0 --.

Column 8,
Line 1, delete "terminal D1" and insert -- terminal DI --.
Line 2, delete "terminal D0" and insert -- terminal DO --.

Column 13,
Line 66, delete "value P(d,)" and insert -- value $P(P_A)$ --.

Signed and Sealed this

Tenth Day of December, 2002

JAMES E. ROGAN
*Director of the United States Patent and Trademark Office*